No. 698,665. Patented Apr. 29, 1902.
T. DUNCAN.
ALTERNATING CURRENT METER.
(Application filed Nov. 4, 1899. Renewed Dec. 16, 1901.)
(No Model.)
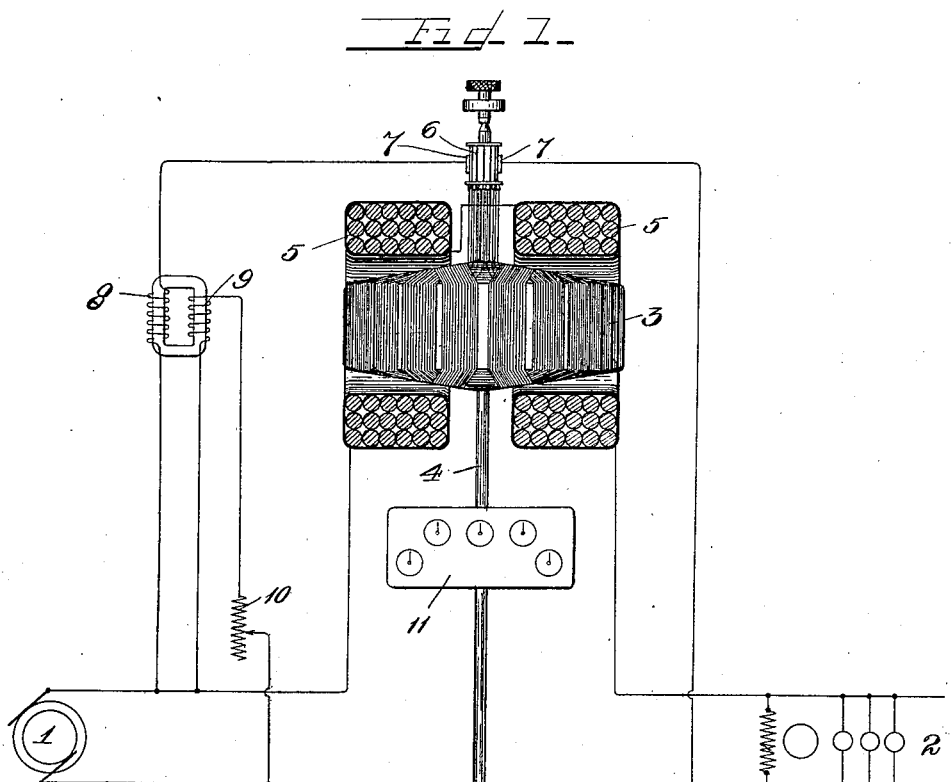
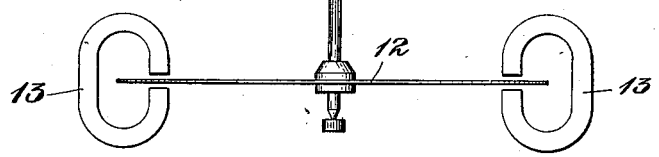
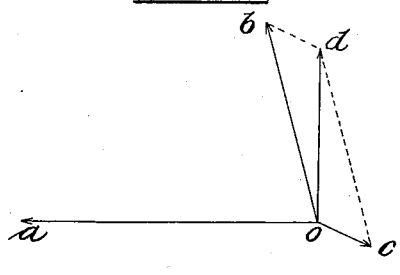
Witnesses
C. J. Schmitt.
Max Zabel.
Inventor
Thomas Duncan
By Charles A. Brown & Cragg
Attorneys
THE NORRIS PETERS CO., PHOTO-LITHO., WASHINGTON, D. C.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 698,665, dated April 29, 1902.

Application filed November 4, 1899. Renewed December 16, 1901. Serial No. 86,055. (No model.)

*To all whom it may concern:*

Be it known that I, THOMAS DUNCAN, a citizen of the United States, residing at Chicago, in the county of Cook and State of Illinois, have invented a certain new and useful Improvement in Alternating-Current Meters, (Case No. 307,) of which the following is a full, clear, concise, and exact description, reference being had to the accompanying drawings, forming a part of this specification.

My invention relates to alternating-current motor-meters, and has for its object the provision of a motor-meter having a field-producing winding upon its armature that will measure the so-called "wattless" component of current in an alternating-current system of distribution.

Heretofore in applications, Serial Nos. 730,847, 730,848, 730,849, filed September 18, 1899, and Serial No. 733,290, filed October 11, 1899, I have shown and described a method of and means for measuring the wattless component of alternating current by means of motor-meters, the type of meter shown in the said applications being of the induction motor-meter type. Generally speaking, my present invention is a modification of the general class of motor-meters shown in the said applications, which is designed to accomplish the same general result. In the present invention I employ a meter whose armature is provided with one of the field-producing windings. In practicing my invention I employ an armature having a field-winding divided into coils, which are connected with a commutator somewhat analogous to the armature of a direct-current motor.

As is well known to those skilled in the art, the current of an alternating-current system may be divided into two components, one of which is in phase with the electromotive force of the circuit, while the other has a lag of ninety degrees. This latter component constitutes the magnetizing or wattless component of the output of alternating-current central stations, and I am enabled to measure this wattless component by means of my improved commutated motor-meter.

Prior to the invention of my said copending applications the methods and means for measuring the wattless component were likely to be inaccurate and were tedious and awkward. The usual method practiced was to make a comparison of the indicated volt-amperes obtained by multiplying the reading of the indicating-voltmeter by the reading of the indicating ampere-meter with the output in watts obtained from an integrating wattmeter. The latter instrument gives the average watts during a certain interval of time, and the volts and amperes are obtained by successive readings of the switchboard indicating instruments. As an illustration of what may happen in obtaining results by this crude method we may assume that the watts in a circuit as obtained through successive readings of an integrating wattmeter are five thousand, the average voltage being one thousand, and the average current a little less than five amperes. The lag in the circuit would then be slight, and the indications of the integrating wattmeter would give very nearly the apparent watts in the circuit. Owing to the temporary fluctuations in a circuit due to motors, the current indicated may for an instant be four amperes, which unusual fluctuation would not be apparent in the readings of the integrating wattmeter to any extent. There would then apparently be a power factor of more than one hundred per cent., the power factor representing the ratio of the true watts to the apparent watts, the apparent watts being obtained by the product of the indications of the switchboard-ammeter and switchboard-voltmeter. Improved means, therefore, for measuring accurately and instantly the lagging component of the current are important, especially where alternating current is supplied to motors of considerable size and number. The difficulty in regulation which is experienced does not arise from the amount of energy which the motors require, which is, as a rule, no more than that of direct-current motors carrying the same load, but from the influence of the lagging or wattless currents resulting from the various inductances of the circuit. Even when the lagging current is measured by a comparison of volt-amperes with watts indicated by instruments of the same type and comparatively calibrated accurate results are not obtained. For example, if the volt-amperes or apparent watts exceed the true watts by only one per cent., it means that there is upon the line a wattless or magnetizing current with a strength fully fourteen per cent. of that of the energy-current. If the excess is two per cent., the magnetizing-current is twenty per cent. as great as the energy-current—that is to say, if the true watts are one hundred and the apparent watts one hundred and one the lagging component, which is found by taking the square root of the difference of the squares of the true and apparent watts, would be fourteen per cent., and if the true watts are one hundred and the apparent watts one hundred and two the lagging component will be twenty. From this illustration it will be apparent that very great and disturbing variations of the wattless output affect but slightly the indicated volt-amperes.

An attempt to secure approximate compensation for the lagging component always existing with induction-motors is sometimes made by the use of synchronous motors for large loads. By means of the synchronous motors a leading current may be produced to balance the lagging component due to the induction-motors. The amount of leading or lagging current which the synchronous motors will induce into the system depends upon the excitation of their fields, and the setting of the field-rheostats, which determine this excitation, is made by the crude process of what is called "adjusting for minimum current," which will reduce the difference between the apparent and true watts in the circuit to a minimum. The current, however, is subject to fluctuations often as high as seventy-five per cent., and since a variation of only two per cent. in the minimum means the introduction of a twenty-per-cent. magnetizing-current it is readily seen that this method of attempted regulation is not satisfactory.

In running alternating-current generators in multiple it is well known that the division of the load cannot be adjusted by varying the field excitation of any one or more than one of them nor can the load of one machine be measured by ampere-meters. Any variation of the field excitation only causes a change of the voltage and a consequent cross magnetizing-current from one machine to the other, demagnetizing one and building up the field of the other to an equality. This cross magnetizing-current should for minimum heat and maximum efficiency be kept as small as possible. By means of my invention I am enabled to employ a commutated motor-meter that is adapted to measure this cross magnetizing-current accurately and readily and to measure and indicate or integrate the lagging or wattless component of an alternating-current system.

Generally speaking, commutated alternating-current motor-meters heretofore devised are provided with shunt or pressure coils forming armatures which are capable of rotation and which receive current that is approximately in phase with the impressed electromotive force. This current, traversing the armature of a commutated meter, sets up a magnetic field that is proportional to the impressed pressure and operating in conjunction with another field produced by a series winding traversed by the main current produces a resultant torque which is proportionate to the real watts, and assuming that the electromotive force is maintained constant the torque will vary as the cosine of the angle between the electromotive force and current or the magnetism of the shunt and series windings. In practicing my present invention I preferably employ a commutated meter whose armature is composed of windings that are adapted to be connected in bridge of supply-mains by means of a commutator and brushes, as it is undesirable to include the armature-winding in circuit, so as to receive the main current or a fraction thereof as it is conveyed to the translating devices.

In the present invention I provide means by which the torque of the commutated meter will be maximum when the angle of lag between the electromotive force and the current is ninety degrees. In a commutated wattmeter the torque will be zero when the angle of lag is ninety degrees. Thus in a wattmeter the greatest turning effort is exerted when there is no difference in phase between the current and electromotive force and no turning effort is exerted when there is a difference of ninety degrees in phase between the current and electromotive force, as the current is then wattless, whereas in the meter of my invention the torque is greatest when the current is wattless and zero when there is no lag.

Where induction-meters are employed to measure the wattless energy, the magnetism which represents the electromotive force is maintained in phase with the electromotive force, while in the preferred form of commutated type of motor-meter that I employ the pressure-magnetism must be maintained in quadrature with the electromotive force, so that when the current in the work-circuit lags ninety degrees it will be in phase with the pressure-magnetism, and both being in phase the torque will be maximum. This torque will vary from zero to maximum as the angle of lag varies from zero to ninety degrees. Commutated meters might be devised, however, wherein it would not be essential to maintain the pressure-magnetism in quadrature with the line or impressed electromotive force; but in all forms of commutated meters for measuring wattless components the fields due to the series and shunt windings should be in phase when the angle of lag is ninety degrees and should vary the torque upon variation in the angle of lag, these fields being in quadrature when there is no lag in the circuit.

I will explain my invention more particularly by reference to the following drawings, illustrating the preferred embodiment thereof, in which—

Figure 1 is a diagrammatic view showing a meter and its circuit connections in accordance with my invention. Fig. 2 is a vector diagram showing the relations in the circuits of a system embodying the invention.

A source of alternating current 1 supplies current to translating devices 2. An armature 3, composed of coils of fine wire, is mounted upon the rotating spindle 4, a series winding, in this instance divided into two coils 5 5, being included in series with one of the main conductors extending from the source of alternating current to the translating devices. These series coils are located upon opposite sides of the spindle 4, the armature projecting within the interior of the said coils. Said series winding is thus included in series with the translating devices and sets up a magnetic field that is proportional to the current strength. The coils of the armature 3 are connected with the segments of the commutator 6 in a usual way, the commutator-brushes 7 serving to include the armature in a bridge between the main leads extending from the generator. In order to have the meter accurately measure the wattless or magnetizing components in alternating-current power-circuits, I provide means whereby a torque varying as the sine of the angle of lag is created. This I accomplish in commutated meters by bringing the fields due to the series and shunt windings in phase when the current in the work-circuit lags ninety degrees, thereby to produce the maximum torque and bring about a variation of the phase difference between these fields when the current ceases to lag ninety degrees.

In the particular embodiment of the invention shown the current through the armature should be maintained in quadrature with the line-pressure, so that the torque will vary as the sine of the angle of lag of the current through the translating devices and be zero when the current and pressure are in phase, when there is no lag in the work-circuit. Many means may be devised for accomplishing this result.

I have herein shown an impedance-coil 8, which causes the current through the armature to lag nearly ninety degrees. In order that the requisite phase adjustment may be exactly secured, I provide an additional coil 9 upon the same magnetic core with the coil 8 and include this inductance 9 in a separate bridge of the main leads, an adjusting active resistance 10 being included in circuit with the inductance 9 for the purpose of adjustment.

By reference to Fig. 2 the phase relations will be readily understood. In this figure $o$ $a$ represent the electromotive force of the main leads; $o\ b$, the current as lagged by the impedance-coil 8; $o\ c$, the secondary current, which is induced in the coil 8 and the shunt-circuit, including the armature, by the primary winding 9. The resultant current $o\ d$ is that which traverses the shunt-circuit, including the armature, and is the resultant of the two currents $o\ b$ and $o\ c$ in the armature-circuit. The magnitude of the component $o\ c$ may be adjusted by varying the resistance 10. The precise form of meter shown records as well as indicates the resultant actions of the fields, a counting-train 11 being driven by the shaft 4. A disk 12, composed, preferably, of aluminium, is mounted upon the shaft 4. Permanent magnets 13 coöperate with the disk to retard the movement of the armature.

While I have herein shown and particularly described one embodiment of my invention, it is obvious that other embodiments thereof may be devised without departing from the spirit of the invention, and I do not therefore wish to be limited to the precise apparatus herein shown and particularly described; but,

Having thus described my invention, I claim as new and desire to secure by Letters Patent—

1. In an alternating-current commutated motor-meter, the combination with a movable measuring element, of means for exerting thereon a torque varying substantially as the sine of the angle of lag between the current and pressure, a portion of said means comprising a movable armature for actuating said element and having a field-producing winding adapted for inclusion in circuit, and a commutator for including said winding, substantially as described.

2. In an alternating-current commutated motor-meter, the combination with a pressure-winding provided with means for maintaining the magnetism due thereto substantially in quadrature with the pressure, a current-winding for producing a second field, and a commutator for conveying current to one of said windings, substantially as described.

3. In an alternating-current motor-meter, the combination with a movable measuring element, of means for exerting thereon a torque varying substantially as the sine of the angle of lag between the current and pressure, a portion of said means comprising a movable armature for actuating said element and having a field-producing winding for inclusion in circuit, substantially as described.

4. In an alternating-current motor-meter, the combination with means for creating and maintaining a field substantially in quadrature with the pressure, of means for creating and maintaining a second field substantially in phase with the current, one of said means comprising a movable armature having a field-producing winding, substantially as described.

5. In an alternating-current commutated motor-meter, the combination with means for creating and maintaining a field substantially in quadrature with the pressure, of means for creating and maintaining a second field substantially in phase with the current, one of said means comprising a movable armature having a field-producing winding, and a commutator for including the armature in circuit, substantially as described.

6. In an alternating-current motor-meter, the combination with a current-winding, of a pressure-winding provided with means for maintaining the field due thereto substantially in quadrature with the pressure, and a movable measuring element, one of the said windings being movable to actuate said element, substantially as described.

7. In an alternating-current commutated motor-meter, the combination with a current-winding, of a pressure-winding provided with means for maintaining the field due thereto substantially in quadrature with the pressure, a movable measuring element, one of the said windings being movable to actuate said element, and a commutator for including the latter winding in circuit, substantially as described.

8. In an alternating-current motor-meter, the combination with a movable measuring element, of means for exerting thereon a torque only when the current is out of phase with the pressure, a portion of said means comprising a movable field-winding capable of actuating said element, substantially as described.

9. In an alternating-current commutated motor-meter, the combination with a movable measuring element, of means for exerting thereon a torque only when the current is out of phase with the pressure, a part of said means comprising a movable winding for actuating said element, and a commutator for including the winding in circuit, substantially as described.

10. In an alternating-current motor-meter, the combination with a movable measuring element, of means for subjecting said element to the magnetic effect of two currents from a single circuit, means for maintaining one of said currents in quadrature with the pressure, a part of the first aforesaid means comprising a movable field-winding capable of actuating said element, substantially as described.

11. In an alternating-current commutated motor-meter, the combination with a movable measuring element, of means for subjecting said element to the magnetic effect of two currents from a single circuit, means for maintaining one of said currents in quadrature with the pressure, a part of the first aforesaid means comprising a movable field-winding capable of actuating said element, and a commutator for including said winding in circuit, substantially as described.

12. In a system of alternating-current distribution, the combination with an alternating-current generator, of series and shunt windings for producing magnetic fields, means for causing said fields to be substantially in phase with each other when the current and pressure are in quadrature, and for varying the phase between the fields as the phase between the current and pressure varies, one of said field-windings being movable, and a movable element actuated by the movable winding and subjected to the action of the fields, substantially as described.

13. In a system of alternating-current distribution, the combination with an alternating-current generator, of series and shunt windings for producing magnetic fields, means for causing said fields to be substantially in phase with each other when the current and pressure are in quadrature and for varying the phase between the fields as the phase between the current and pressure varies, one of said field-windings being movable, a movable element actuated by the movable winding and subjected to the action of the fields, and a commutator for including one of said windings in circuit, substantially as described.

14. In a system of alternating-current distribution, the combination with a source of alternating current, of series and shunt windings receiving current therefrom, one of the said windings being movable, a movable element subjected to the action of said movable winding, and means for maintaining the phase of the magnetism due to said shunt-winding substantially in quadrature with the pressure, substantially as described.

15. In a system of alternating-current distribution, the combination with a source of alternating current, of series and shunt windings in inductive relation with each other and receiving current therefrom, one of the said windings being movable, a movable element subjected to the action of said movable winding, and means for maintaining the phase of the magnetism due to said shunt-winding substantially in quadrature with the pressure, substantially as described.

16. In a system of alternating-current distribution, the combination with a source of alternating current, of series and shunt windings receiving current therefrom, the shunt-winding being movable, a movable element subjected to the action of said movable winding, means for maintaining the phase of the magnetism due to said shunt-winding substantially in quadrature with the pressure, and a commutator for including the shunt-winding in circuit, substantially as described.

17. In a system of alternating-current distribution, the combination with a source of alternating current, of series and shunt windings in inductive relation with each other and receiving current therefrom, the said shunt-winding being movable, a movable element subjected to the action of said movable winding, means for maintaining the phase of the magnetism due to said shunt-winding substantially in quadrature with the pressure, and a commutator for including the shunt-winding in circuit, substantially as described.

18. In a system of alternating-current distribution, the combination with an alternating-current generator, of series and shunt windings receiving current therefrom, the shunt-winding being movable and constituting an armature, a measuring or indicating element actuated by the shunt-winding, and a phase modifier or reactance, for maintaining the phase of the current due to the shunt-winding substantially in quadrature with the pressure, substantially as described.

19. In a system of alternating-current distribution, the combination with an alternating-current generator, of series and shunt windings receiving current therefrom, the shunt-winding being movable and constituting an armature, a measuring or indicating element actuated by the shunt-winding, inductance 8 in circuit with the armature, and adjusting means for modifying the action of the inductance to maintain the magnetism due to the shunt-winding in quadrature with the pressure, substantially as described.

20. In a system of alternating-current distribution, the combination with an alternating-current generator, of series and shunt windings receiving current therefrom, the shunt-winding being movable and constituting an armature, a measuring or indicating element actuated by the shunt-winding, inductance 8 in circuit with the armature, and a second inductance 9 to modify action of inductance 8 to maintain the phase of field due to the shunt-winding, substantially in quadrature with the pressure, substantially as described.

21. In a system of alternating-current distribution, the combination with an alternating-current generator, of series and shunt windings receiving current therefrom, the shunt-winding being movable and constituting an armature, a measuring or indicating element actuated by the shunt-winding, inductance 8 in circuit with the armature, a second inductance 9 to modify action of inductance 8 to maintain the phase of field due to the shunt-winding substantially in quadrature with the pressure, and adjusting resistance 10 in circuit with the inductance 9, substantially as described.

22. In a system of alternating-current distribution, the combination with an alternating-current generator, of series and shunt windings receiving current therefrom, the shunt-winding being movable and constituting an armature, a measuring or indicating element actuated by the shunt-winding, inductance 8 in circuit with the armature, a second inductance 9 to modify action of inductance 8 to maintain the phase of field due to the shunt-winding substantially in quadrature with the pressure, an adjusting resistance 10 in circuit with the inductance 9, and a commutator for including the shunt-winding in circuit, substantially as described.

23. In an alternating-current motor, the combination with two field-windings, one of which is movable, of means for maintaining the field due to one of said windings in quadrature with the pressure, substantially as described.

In witness whereof I hereunto subscribe my name this 31st day of October, A. D. 1899.

THOMAS DUNCAN.

Witnesses:
CHARLES A. BROWN,
CHARLES E. HUBERT.